(12) United States Patent
Iwata et al.

(10) Patent No.: US 12,490,533 B2
(45) Date of Patent: Dec. 2, 2025

(54) SOLID-STATE IMAGE SENSOR FILTER AND SOLID-STATE IMAGE SENSOR

(71) Applicant: TOPPAN PRINTING CO., LTD., Tokyo (JP)

(72) Inventors: Reiko Iwata, Taito-ku (JP); Yuri Hirai, Taito-ku (JP); Kazushige Kitazawa, Taito-ku (JP); Tadatoshi Maeda, Taito-ku (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 602 days.

(21) Appl. No.: 17/390,039

(22) Filed: Jul. 30, 2021

(65) Prior Publication Data
US 2021/0358983 A1    Nov. 18, 2021

Related U.S. Application Data

(63) Continuation of application No. PCT/JP2020/002764, filed on Jan. 27, 2020.

(30) Foreign Application Priority Data

Jan. 31, 2019   (JP) .................................. 2019-015209
Jan. 31, 2019   (JP) .................................. 2019-015210

(51) Int. Cl.
*H10F 39/00*    (2025.01)
*G02B 5/20*     (2006.01)

(52) U.S. Cl.
CPC ......... *H10F 39/8053* (2025.01); *G02B 5/201* (2013.01); *G02B 5/208* (2013.01); *H10F 39/8063* (2025.01)

(58) Field of Classification Search
CPC ......... H01L 27/14621; H01L 27/14627; H01L 29/8063; G02B 5/208; G02B 5/201
See application file for complete search history.

(56) References Cited

U.S. PATENT DOCUMENTS 7,264,976 B2 *   9/2007   Deng .............. B29D 11/00278
                                                  257/E33.068
2004/0185588 A1 * 9/2004  Fukuyoshi ........ H01L 27/14685
                                                          438/22

(Continued)

FOREIGN PATENT DOCUMENTS

CN    108141939 A    6/2018
JP    2003-060176 A  2/2003

(Continued)

OTHER PUBLICATIONS

Taiwanese Office Action issued Feb. 24, 2023 in Taiwan Application No. 109102968, (with English translation), 12 pages.

(Continued)

*Primary Examiner* — Vincent Wall
(74) *Attorney, Agent, or Firm* — Oblon, McClelland, Maier & Neustadt, L.L.P.

(57) ABSTRACT

A solid-state image sensor filter includes: a light-incident surface on which light is incident; an infrared filter located on a side of a photoelectric conversion element on which the light-incident surface is disposed; and a barrier layer located on a side of the infrared filter on which the light-incident surface is disposed, the barrier layer being provided to suppress transmission of an oxidation source to thereby prevent the infrared filter from being oxidized.

12 Claims, 8 Drawing Sheets

(56) References Cited

U.S. PATENT DOCUMENTS

| | | | |
|---|---|---|---|
| 2007/0164193 A1* | 7/2007 | Lee | H10F 39/024 257/432 |
| 2012/0243077 A1* | 9/2012 | Osawa | H10F 39/8053 359/356 |
| 2013/0134540 A1* | 5/2013 | Maeda | H10F 77/413 438/69 |
| 2015/0168611 A1 | 6/2015 | Osawa et al. | |
| 2016/0104735 A1* | 4/2016 | Li | G02B 5/208 359/359 |
| 2017/0111618 A1* | 4/2017 | Hsieh | H04N 9/01 |
| 2017/0115436 A1* | 4/2017 | Qian | H04N 25/131 |
| 2017/0317132 A1* | 11/2017 | Hatakeyama | H10F 39/184 |
| 2017/0351014 A1* | 12/2017 | Matsumura | H10F 77/40 |
| 2018/0040651 A1* | 2/2018 | Lee | H10F 39/014 |
| 2018/0114805 A1 | 4/2018 | Takiguchi et al. | |
| 2018/0274753 A1 | 9/2018 | Sakaino et al. | |
| 2019/0300694 A1* | 10/2019 | Takahashi | G02B 5/208 |
| 2019/0361158 A1* | 11/2019 | Kitajima | G03F 7/0045 |
| 2021/0079210 A1* | 3/2021 | Tsuyama | G02F 1/1335 |
| 2021/0325576 A1* | 10/2021 | Schwartz | G06V 10/147 |

FOREIGN PATENT DOCUMENTS

| | | |
|---|---|---|
| JP | 2004-200360 A | 7/2004 |
| JP | 2012-84608 A | 4/2012 |
| JP | 2014-066918 A | 4/2014 |
| JP | 2016-177273 A | 10/2016 |
| JP | 2017-181705 A | 10/2017 |
| JP | 2018-060910 A | 4/2018 |
| JP | 2018-119077 A | 8/2018 |
| JP | 2018-120097 A | 8/2018 |
| WO | WO 2014/021232 A1 | 2/2014 |
| WO | WO 2016/117596 A1 | 7/2016 |
| WO | WO 2016/189789 A1 | 12/2016 |
| WO | WO 2018/142804 A1 | 8/2018 |
| WO | WO 2018/163702 A1 | 9/2018 |

OTHER PUBLICATIONS

International Search Report issued Mar. 31, 2020 in PCT/JP2020/002764, filed Jan. 27, 2020, (with English Translation).

Extended European Search Report issued May 2, 2022 in European Patent Application 20749777.7, 12 pages.

"Converting OTR/WVTR Values Between Films & Packages, Oxygen & Water Vapor TR Unit Conversions" Ametek, XP055791552, Jun. 12, 2017, 2 pages.

Partial Supplementary European Search Report issued Feb. 15, 2022 in corresponding European Patent Application No. 20749777.7, 11 pages.

Office Communication issued Sep. 3, 2024 in corresponding Korean Patent Application No. Application No. 10-2021-7027267 (with English-language Translation), 17 pages.

Japanese Office Action issued Dec. 12, 2023 in Japanese Patent Application No. 2020-569612 (with unedited computer-generated English translation), 6 pages.

* cited by examiner

SOLID-STATE IMAGE SENSOR FILTER AND SOLID-STATE IMAGE SENSOR

CROSS-REFERENCE TO RELATED APPLICATIONS

The present application is a continuation of International Application No. PCT/JP2020/002764, filed Jan. 27, 2020, which is based upon and claims the benefits of priority to Japanese Application No. 2019-015209, filed Jan. 31, 2019 and Japanese Application No. 2019-015210, filed Jan. 31, 2019. The entire contents of all of the above applications are incorporated herein by reference.

BACKGROUND OF THE INVENTION

Field of the Invention

The present invention relates to a solid-state image sensor filter and a solid-state image sensor having the solid-state image sensor filter.

Discussion of the Background

Solid-state image sensors such as CMOS image sensors and CCD image sensors include photoelectric conversion elements that convert the intensity of light into an electrical signal. A first example of a solid-state image sensor includes color filters and color photoelectric conversion elements for respective colors, and the photoelectric conversion elements for respective colors detect respective color light (for example, see PTL 1). A second example of a solid-state image sensor includes an organic photoelectric conversion element and an inorganic photoelectric conversion element, and the photoelectric conversion elements detect respective color light without using a color filter (for example, see PTL 2).

The photoelectric conversion elements have an absorption band not only in the visible light range, but also in the infrared light range including near-infrared light. A third example of a solid-state image sensor includes an infrared cut-off filter disposed on a photoelectric conversion element, and cuts off infrared light that may otherwise be detected by the photoelectric conversion element, to prevent it from reaching the photoelectric conversion element, to thereby improve the accuracy of detection of visible light by the photoelectric conversion element. The materials constituting the infrared cut-off filter may be, for example, anthraquinone-based compounds, phthalocyanine-based compounds, cyanine-based compounds, immonium-based compounds, or diimmonium-based compounds (for example, see PTLs 1, 3, and 4).

A fourth example of a solid-state image sensor includes an infrared pass filter disposed on an infrared photoelectric conversion element, and cuts off visible light that may otherwise be detected by the infrared photoelectric conversion element, to prevent it from reaching the infrared photoelectric conversion element, to thereby improve the accuracy of detection of infrared light by the infrared photoelectric conversion element. Materials constituting the infrared pass filter may be, for example, black colorants such as bisbenzofuranone-based pigments, azomethine-based pigments, perylene-based pigments, or azo-based dyes (for example, PTLs 5 and 6).

PTL 1: JP 2003-060176 A
PTL 2: JP 2018-060910 A
PTL 3: JP 2017-181705 A
PTL 4: JP 2018-120097 A
PTL 5: JP 2016-177273 A
PTL 6: JP 2018-119077 A

SUMMARY OF THE INVENTION

According to an aspect of the present invention, a solid-state image sensor filter for use with a photoelectric conversion element includes color microlenses which have a light-incident surface on which light is incident and collect the light incident on the light-incident surface toward a photoelectric conversion element to be combined with the solid-state image sensor filter, an infrared filter positioned between the color microlenses and the photoelectric conversion element, and a barrier layer formed between the color microlenses and the infrared filter such that transmission of an oxidation source that oxidizes the infrared filter is suppressed.

According to another aspect of the present invention, a solid-state image sensor filter for use with a photoelectric conversion element includes color microlenses which have a light-incident surface on which light is incident and collect the light incident on the light-incident surface toward a photoelectric conversion element to be combined with the solid-state image sensor filter, and an infrared filter positioned between the color microlenses and the photoelectric conversion element. A laminate structure formed between the color microlenses and the infrared filter has an oxygen transmittance of 5.0 cc/m$^2$/day/atm or less.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
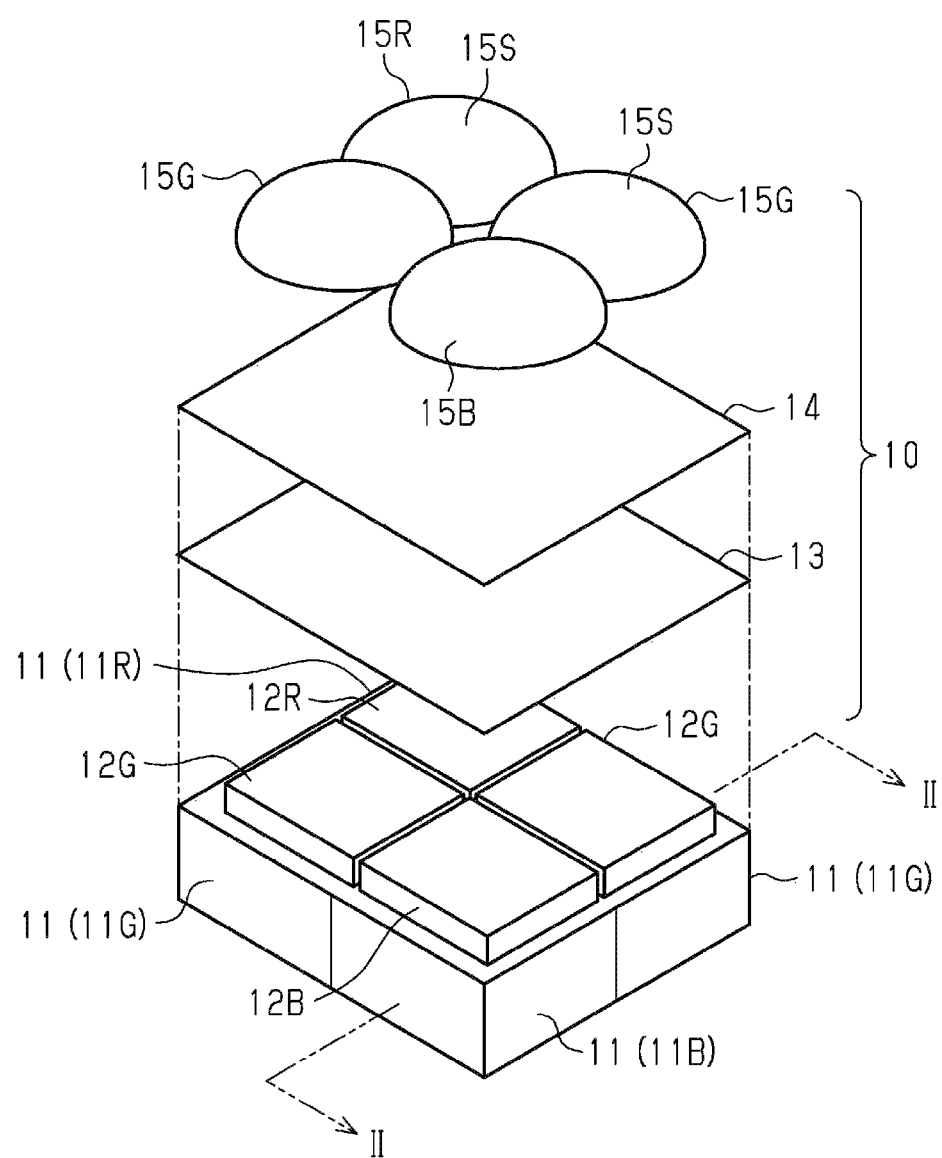
FIG. 1 is a partial exploded perspective view of a layer structure of a solid-state image sensor according to a first embodiment.

The embodiments will now be described with reference to the accompanying drawings, wherein like reference numerals designate corresponding or identical elements throughout the various drawings.

First Embodiment

Figure 2:
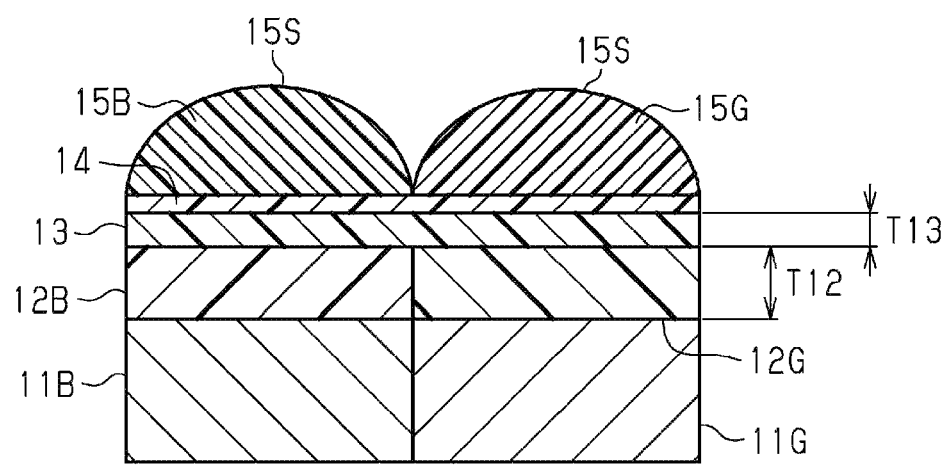
FIG. 2 is a cross-sectional view taken along the line II-II of FIG. 1.

With reference to FIGS. 1 and 2, a first embodiment of a solid-state image sensor filter and a solid-state image sensor will be described. FIG. 1 is a schematic configuration diagram in which layers in part of a solid-state image sensor are separately illustrated. The structures shown in FIGS. 1 and 2 are example structures of a solid-state image sensor. The solid-state image sensor includes respective color filters, in which a gap may be provided between the color filters as shown in FIG. 1, or may not be provided as shown in FIG. 2.

As shown in FIG. 1, the solid-state image sensor includes a solid-state image sensor filter 10 and a plurality of photoelectric conversion elements 11. The solid-state image sensor filter 10 includes color filters 12R, 12G, and 12B, an infrared cut-off filter 13 as an example of an infrared filter, a barrier layer 14, and respective color microlenses 15R, 15G, and 15B.

The color filters 12R, 12G, and 12B are disposed between the photoelectric conversion elements 11 for three colors and the infrared cut-off filter 13. The barrier layer 14 is disposed between the infrared cut-off filter 13 and the color microlenses 15R, 15G, and 15B. The infrared cut-off filter 13 is disposed on a light-incident side of the color filters 12R, 12G, and 12B. The barrier layer 14 is disposed on a light-incident side of the infrared cut-off filter 13.

The photoelectric conversion elements 11 for three colors are composed of a red photoelectric conversion element 11R, a green photoelectric conversion element 11G, and a blue photoelectric conversion element 11B. The solid-state image sensor includes a plurality of red photoelectric conversion elements 11R, a plurality of green photoelectric conversion elements 11G, and a plurality of blue photoelectric conversion elements 11B. FIG. 1 illustrates one repeating unit of the photoelectric conversion elements 11 in the solid-state image sensor.

The color filters for three colors are composed of a red filter 12R, a green filter 12G, and a blue filter 12B. The red filter 12R is disposed on a light-incident side of the red photoelectric conversion element 11R. The green filter 12G is disposed on a light-incident side of the green photoelectric conversion element 11G. The blue filter 12B is disposed on a light-incident side of the blue photoelectric conversion element 11B.

As shown in FIG. 2, the color filters 12R, 12G, and 12B have thicknesses T12 which may be substantially the same or different from each other. That is, the thicknesses of the red filter 12R, the green filter 12G, and the blue filter 12B may not necessarily be the same. The thickness T12 of the color filters 12R, 12G, and 12B is, for example, 0.5 μm or more and 5 μm or less.

An infrared light cut-off function of the infrared cut-off filter 13 may depend on a thickness T13 of the infrared cut-off filter 13. The thickness T13 of the infrared cut-off filter 13 may vary depending on the level difference among the color filters 12R, 12G, and 12B. In view of improvement in flatness of an underlayer of the infrared cut-off filter 13, the difference in the thickness T12 among the color filters 12R, 12G, and 12B is preferably smaller than the thickness T13 of the infrared cut-off filter 13.

The color filters 12R, 12G, and 12B are formed by forming a coating film containing a color photosensitive resin and patterning the coating film by using a photolithography method. For example, a coating film containing a red photosensitive resin is formed by applying coating liquid containing a red photosensitive resin and drying the coating film. The red filter 12R is formed by exposure and development of the coating film containing a red photosensitive resin. When the red photosensitive resin is a negative photosensitive resin, a portion of the coating film containing a red photosensitive resin, corresponding to the red filter 12R, is exposed. On the other hand, when the red photosensitive resin is a positive photosensitive resin, portions of the coating film containing a red photosensitive resin, corresponding to regions other than the red filter 12R, are exposed.

The color compositions for the red filter 12R, the green filter 12G, and the blue filter 12B may include organic or inorganic pigments, and these pigments can be used singly or in combination of two or more. Pigments having high color development and high thermal stability, particularly high resistance to thermal decomposition, are preferred. Typically, organic pigments are used. Examples of the pigments include organic pigments such as phthalocyanine-based pigments, azo-based pigments, anthraquinone-based pigments, quinacridone-based pigments, dioxazine-based pigments, anthanthrone-based pigments, indanthrone-based pigments, perylene-based pigments, thioindigo-based pigments, isoindoline-based pigments, quinophthalone-based pigments, and diketopyrrolopyrrole-based pigment.

Specific examples of the organic pigments that can be used for the color composition will be described below using color index numbers.

A blue pigment used for blue color composition in the color filters may be, for example, C.I. Pigment Blue 15, 15:1, 15:2, 15:3, 15:4, 15:6, 16, 22, 60, 64, or 81. Among these, C.I. Pigment Blue 15:6 is preferred as a blue pigment.

A violet pigment may be, for example, C.I. Pigment Violet 1, 19, 23, 27, 29, 30, 32, 37, 40, 42, or 50. Among these, C.I. Pigment Violet 23 is preferred as a violet pigment.

A yellow pigment may be, for example, C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213, or 214. Among these, C.I. Pigment Yellow 13, 150, or 185 is preferred as a yellow pigment.

A red color composition is a composition obtained by using a red pigment, instead of a blue pigment or the like, and a toning pigment if necessary. The red pigment may be, for example, C.I. Pigment Red 7, 9, 14, 41, 48:1, 48:2, 48:3, 48:4, 81:1, 81:2, 81:3, 97, 122, 123, 146, 149, 168, 177, 178, 180, 184, 185, 187, 192, 200, 202, 208, 210, 215, 216, 217, 220, 223, 224, 226, 227, 228, 240, 246, 254, 255, 264, 272, C.I. Pigment Orange 36, 43, 51, 55, 59, 61, 71, or 73. The toning pigment may be, for example, C.I. Pigment Yellow 1, 2, 3, 4, 5, 6, 10, 12, 13, 14, 15, 16, 17, 18, 24, 31, 32, 34, 35, 35:1, 36, 36:1, 37, 37:1, 40, 42, 43, 53, 55, 60, 61, 62, 63, 65, 73, 74, 77, 81, 83, 93, 94, 95, 97, 98, 100, 101, 104, 106, 108, 109, 110, 113, 114, 115, 116, 117, 118, 119, 120, 123, 126, 127, 128, 129, 138, 139, 147, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 198, 199, 213, or 214.

Further, a green color composition may be used including a green pigment and a toning pigment, instead of a blue pigment or the like. The green pigment may be, for example, C.I. Pigment Green 7, 10, 36, 37, 58, or 59. The toning pigment may be a yellow pigment described above as a toning pigment for the red color composition.

The infrared cut-off filter 13 cuts off infrared light that may otherwise be detected by the photoelectric conversion elements 11, to prevent it from reaching the photoelectric conversion elements 11, to thereby improve the accuracy of detection of visible light by the photoelectric conversion elements 11. That is, the infrared cut-off filter 13 prevents infrared light that may otherwise be detected by the photoelectric conversion elements 11, to prevent it from passing through to the photoelectric conversion elements 11. The infrared light that may be detected by the photoelectric conversion elements 11 is near-infrared light having a wavelength of, for example, 800 nm or more and 1000 nm or less. The infrared cut-off filter 13 is a layer common to the red filter 12R, the green filter 12G, and the blue filter 12B. That is, a single infrared cut-off filter 13 covers the red filter 12R, the green filter 12G, and the blue filter 12B.

A material constituting the infrared cut-off filter 13 may be a transparent resin containing an infrared absorbing dye. Examples of the infrared absorbing dyes include anthraquinone-based dyes, cyanine-based dyes, phthalocyanine-based dyes, dithiol-based dyes, diimmonium-based dyes, squarylium-based dyes, and croconium-based dyes. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin. The infrared cut-off filter 13 is formed by film formation by a coating method or the like.

The transmission spectrum of the infrared cut-off filter 13 preferably satisfies the following conditions [A1] to [A3].
[A1] The average transmittance in the wavelength range of 450 nm or more and 650 nm or less is 80% or more.
[A2] A maximum absorption is achieved in the wavelength range of 800 nm or more and 1000 nm or less.
[A3] A cut-off wavelength width, which is a difference between the cut-off wavelength on the short-wavelength side at which the transmittance is 50% and the cut-off wavelength on the long-wavelength side at which the transmittance is 50%, is 100 nm or more.

With a configuration satisfying [A1], absorption of the visible light by the infrared cut-off filter 13 is sufficiently suppressed. With a configuration satisfying [A2] and [A3], the infrared cut-off filter 13 sufficiently cuts off the infrared light that may otherwise be detected by the respective color photoelectric conversion elements 11.

A barrier function of the barrier layer 14 against an oxidation source may depend on the thickness of the barrier layer 14. The thickness of the barrier layer 14 on the infrared cut-off filter 13 may vary depending on the level difference on the upper surface of the infrared cut-off filter 13. In view of improvement in flatness of an underlayer of the barrier layer 14, the thickness T13 of the infrared cut-off filter 13 is preferably a size that provides suitable flatness to the upper surface of the infrared cut-off filter 13. For suitable flatness, for example, the level difference on the upper surface of the infrared cut-off filter 13 is smaller than three times the thickness of the barrier layer 14.

When the infrared absorbing dye described above is exposed to oxygen and water in the atmosphere in an environment irradiated with sunlight, the transmission spectrum in the near-infrared range changes. That is, when the infrared cut-off filter 13 is exposed to an oxidation source in an environment irradiated with sunlight, the near-infrared light cut-off performance decreases.

The barrier layer 14 suppresses transmission of oxygen and water, which are oxidation sources for the infrared cut-off filter 13, to thereby suppress a decrease in the near-infrared light cut-off performance and a decrease in the visible light transmission performance of the infrared absorbing dye. The barrier layer 14 is a layer common to the red filter 12R, the green filter 12G, and the blue filter 12B. That is, one barrier layer 14 covers the red filter 12R, the green filter 12G, and the blue filter 12B.

A material constituting the barrier layer 14 may be an inorganic compound. The material constituting the barrier layer 14 is preferably a silicon compound. The material constituting the barrier layer 14 is, for example, at least one selected from the group consisting of silicon nitride, silicon oxide, and silicon oxynitride.

The barrier layer 14 is formed by film formation using a vapor phase film formation method such as sputtering, CVD, or ion plating, or a liquid phase film formation method such as coating. For example, a barrier layer 14 made of a silicon oxide may be formed by film formation by sputtering using a target made of silicon oxide onto a substrate on which the infrared cut-off filter 13 is formed. For example, the barrier layer 14 made of a silicon oxide may be formed by film formation by CVD using silane and oxygen onto a substrate on which the infrared cut-off filter 13 is formed. For example, the barrier layer 14 made of a silicon oxide may be formed by applying a coating liquid containing a polysilazane, modifying, and drying the coating film.

The oxygen transmittance, thickness, and transmittance in the visible light range of the barrier layer 14 preferably satisfy the following condition [B1] or [B3].
[B1] The oxygen transmittance according to JIS K 7126-2:2006 is 5.0 cc/m$^2$/day/atm or less. In other words, the oxygen transmittance is 5.0 cm$^3$/m$^2$/day/atm or less. The oxygen transmittance is measured in accordance with appendix A of JIS K 7126-2:2006, at 23° C. and RH 50%.
[B2] The thickness of the barrier layer 14 is 10 nm or more and 500 nm or less.
[B3] The transmittance in the visible light range (average) of the barrier layer 14 is 90% or more.

With a configuration satisfying [B1], it is possible to sufficiently prevent an oxidation source, particularly oxygen, from reaching the infrared cut-off filter 13. In view of improvement in light resistance of the infrared cut-off filter 13, the oxygen transmittance is preferably 3.0 cc/m²/day/atm or less, more preferably 1.0 cc/m²/day/atm or less, and still more preferably 0.7 cc/m²/day/atm or less. In other words, the oxygen transmittance is preferably 3.0 cm³/m²/day/atm or less, more preferably 1.0 cm³/m²/day/atm or less, and still more preferably 0.7 cm³/m²/day/atm or less.

With a configuration satisfying [B2], a material constituting [B1] and [B3] can be easily selected. Further, it is possible to prevent occurrence of cracking in the barrier layer 14. With a configuration satisfying [B3], absorption of the visible light by the barrier layer 14 is sufficiently suppressed.

The barrier layer 14 may have a single-layer structure made of a single compound, a laminate structure composed of layers made of a single compound, or a laminate structure composed of layers made of compounds different from each other. For example, the barrier layer 14 may have a laminate structure composed of layers, each of which alone does not satisfy [B1], to form a configuration satisfying [B1].

As shown in FIG. 1, the color microlenses include the red microlenses 15R, the green microlenses 15G, and the blue microlenses 15B. The red microlenses 15R are disposed on a light-incident side of the red filter 12R. The green microlenses 15G are disposed on a light-incident side of the green filter 12G. The blue microlenses 15B are disposed on a light-incident side of the blue filter 12B.

The color microlenses 15R, 15G, and 15B have a light-incident surface 15S which is an outer surface. In order to collect light incident on the light-incident surface 15S toward the respective color photoelectric conversion elements 11R, 11G, and 11B, the color microlenses 15R, 15G, and 15B respectively have a refractive index different from a refractive index of the outside air by a predetermined amount.

The color microlenses 15R, 15G, and 15B are formed by forming a coating film containing a transparent resin, patterning the coating film by using a photolithography method, and performing reflow by heat treatment. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin.

As described above, according to the first embodiment of the solid-state image sensor filter and the solid-state image sensor, the following effects can be achieved.

(1-1) Since the barrier layer 14 prevents an oxidation source from reaching the infrared cut-off filter 13, oxidation of the infrared cut-off filter 13 by the oxidation source can be suppressed. Accordingly, it is possible to improve the light resistance of the infrared cut-off filter 13, and thus improve the light resistance of the solid-state image sensor.

(1-2) With a configuration satisfying [B1], the effect as in the above (1-1) can be achieved. In particular, oxidation of the infrared cut-off filter 13 due to oxygen can be suppressed.

(1-3) When the thickness T13 of the infrared cut-off filter 13 has a size that provides suitable flatness to the upper surface of the infrared cut-off filter 13, occurrence of variation in the effect of the above (1-1) and (1-2) can be reduced.

(1-4) The larger the difference in the thickness T12 among the color filters 12R, 12G, and 12B, the larger the thickness T13 for providing suitable flatness to the upper surface of the infrared cut-off filter 13. Accordingly, when the difference in the thickness T12 among the color filters 12R, 12G, and 12B is smaller than the thickness T13 of the infrared cut-off filter 13, the thickness T13 for obtaining the effect as in the above (1-3) can be reduced. Accordingly, the thickness T13 of the infrared cut-off filter 13 can be a size specialized for cutting off the infrared light.

The above first embodiment can be modified and implemented as follows.

<First Modification>

Figure 3:
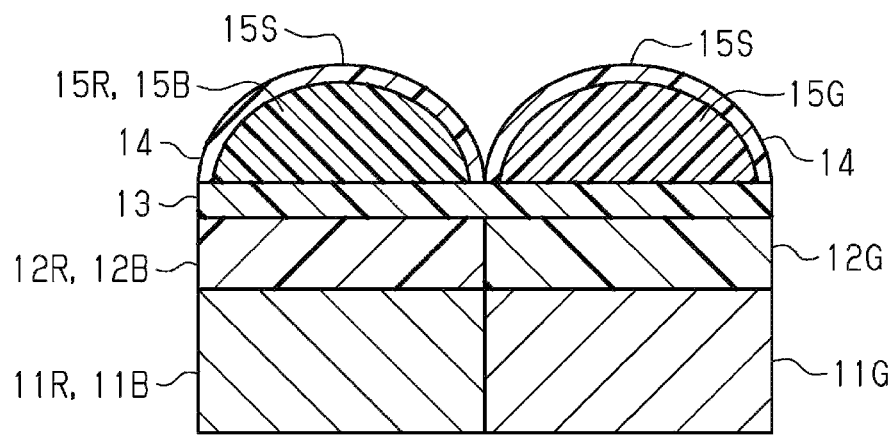
FIG. 3 is a cross-sectional view of a layer structure according to a first modification of a solid-state image sensor of the first embodiment.

As shown in FIG. 3, the barrier layer 14 may not necessarily be disposed between the infrared cut-off filter 13 and the color microlenses 15R, 15G, and 15B, and may be disposed on the outer surface of the color microlenses 15R, 15G, and 15B. In this case, the outer surface of the barrier layer 14 functions as a light-incident surface of the solid-state image sensor on which light is incident. In short, the barrier layer 14 may be positioned on a light-incident side of the infrared cut-off filter 13.

(1-5) According to the first modification, the barrier layer 14 is disposed on optical surfaces (flat surfaces) of the color microlenses 15R, 15G, and 15B. Accordingly, the thickness of the barrier layer 14 can be easily made uniform, and thus the barrier function of the barrier layer 14 against an oxidation source can be easily made uniform.

(1-6) In the configuration of the first modification, the refractive index of the barrier layer 14 is preferably smaller than the refractive indices of the color microlenses 15R, 15G, and 15B. More preferably, the difference between the refractive indices of the color microlenses 15R, 15G, and 15B and the refractive index of the barrier layer 14 is 0.1 or more. With this configuration, since the difference between the refractive index of air and the refractive indices of the color microlenses can be reduced, reflected light generated on the light-incident surface can be reduced.

(1-7) The barrier layer 14 preferably further has an antireflection function to visible light. When the barrier layer 14 has an antireflection function as well, it is possible to suppress a decrease in detection sensitivity due to reflection at the light-incident surface. In addition, since the barrier layer 14 that reduces transmission of an oxidation source has an antireflection function, the layer structure of the solid-state image sensor filter 10 can be simplified compared with a configuration in which an antireflection layer is separately provided. The antireflection function may be implemented by a difference between the refractive index of the barrier layer 14 and the refractive indices of other layers, or may be implemented by the barrier layer 14 having an uneven surface formed by including a filler in the barrier layer 14 or by embossing barrier layer 14.

<Second Modification>

Figure 4:
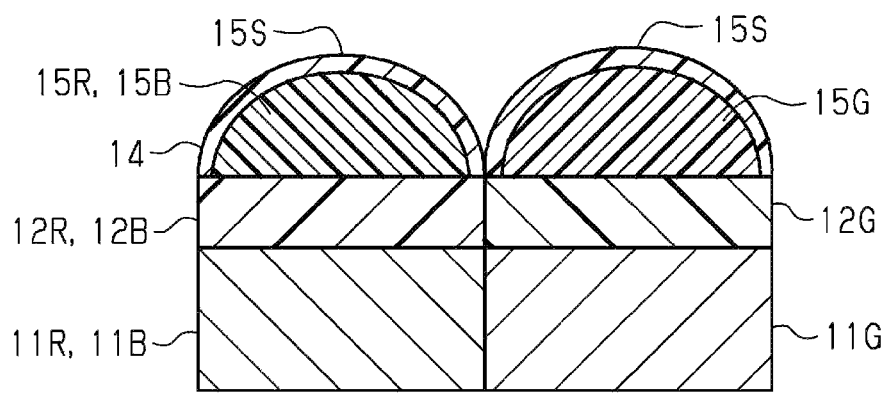
FIG. 4 is a cross-sectional view of a layer structure according to a second modification of a solid-state image sensor of the first embodiment.

As shown in FIG. 4, a cut off function of the infrared cut-off filter 13 may be implemented by a layer other than the infrared cut-off filter 13. For example, a cut off function of the infrared cut-off filter may be implemented by the color microlenses 15R, 15G, and 15B. That is, in the solid-state image sensor filter 10, a material constituting the color microlenses 15R, 15G, and 15B can contain an infrared absorbing dye. Accordingly, the solid-state image sensor filter 10 can be modified to a configuration in which the infrared cut-off filter 13 is omitted.

(1-8) When an infrared cut-off function is implemented by the color microlenses 15R, 15G, and 15B, the layer structure of the solid-state image sensor filter 10 can be simplified.

<Third Modification>

Figure 5:
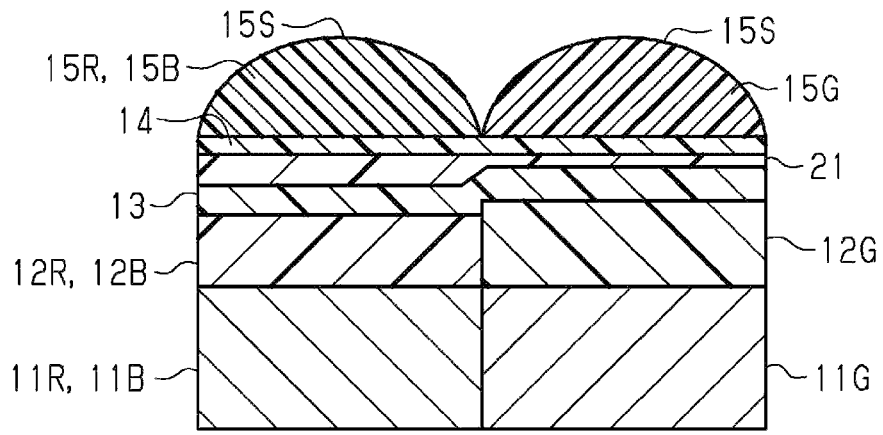
FIG. 5 is a cross-sectional view of a layer structure according to a third modification of a solid-state image sensor of the first embodiment.

As shown in FIG. 5, the color filters 12R, 12G, and 12B tend to have thicknesses different from each other in order to convert light of different colors into approximately the same intensity. Accordingly, filters for one color tend to have a level difference from filters for other colors. In this case, the infrared cut-off filter 13 tends to have a shape following the level difference formed by the color filters different from each other. As described above, the shape of the infrared cut-off filter 13 following the level difference causes variations in thickness of the barrier layer 14, and thus the barrier function of the oxidation source.

Therefore, the solid-state image sensor filter 10 may further include a flattening layer 21 between the infrared cut-off filter 13 and the barrier layer 14. The flattening layer 21 has optical transmittance for transmitting visible light, and a surface of the flattening layer 21 has a flat surface, filling the level difference formed by the infrared cut-off filter 13. That is, the flattening layer 21 has a shape that can reduce differences in height of the surface of the infrared cut-off filter 13.

A material constituting the flattening layer 21 may be a transparent resin. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin. The flattening layer 21 is formed by film formation using a liquid phase film formation method such as coating.

(1-9) When the solid-state image sensor filter 10 includes the flattening layer 21, it is possible to obtain the effect as in the above (1-3) and remove constraints for achieving flatness from the thickness T13 of the infrared cut-off filter 13 and the thickness T12 of the color filters 12R, 12G, and 12B.

<Fourth Modification>

Figure 6:
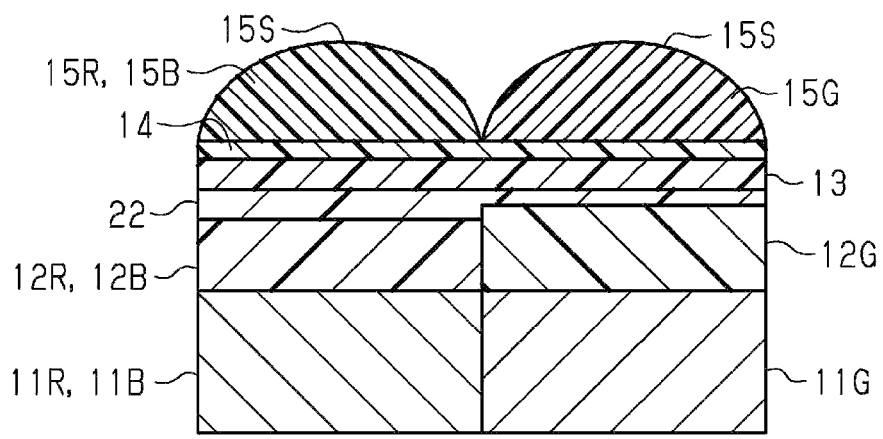
FIG. 6 is a cross-sectional view of a layer structure according to a fourth modification of a solid-state image sensor of the first embodiment.

As shown in FIG. 6, the solid-state image sensor filter 10 can include a flattening layer 22 between the color filters 12R, 12G, and 12B and the infrared cut-off filter 13. A material constituting the flattening layer 22 and a method of forming the flattening layer 22 may be the same as those in the third modification.

(1-10) When the solid-state image sensor filter 10 includes the flattening layer 22, it is possible to obtain the effect as in the above (1-3) and homogenize the infrared light cut-off function of the infrared cut-off filter 13.

<Fifth Modification>

Figure 7:
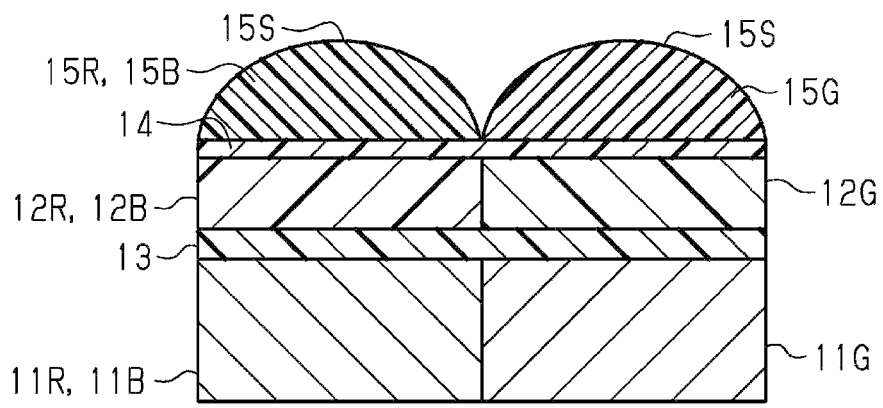
FIG. 7 is a cross-sectional view of a layer structure according to a fifth modification of a solid-state image sensor of the first embodiment.

As shown in FIG. 7, the position of the infrared cut-off filter 13 is not limited to between the color filters 12R, 12G, and 12B and the barrier layer 14. The position of the infrared cut-off filter 13 may be modified to, for example, between the photoelectric conversion elements 11 and the color filters 12R, 12G, and 12B. In short, the infrared cut-off filter 13 may be disposed between the barrier layer 14 and the photoelectric conversion elements 11.

<Sixth Modification>

Figure 8:
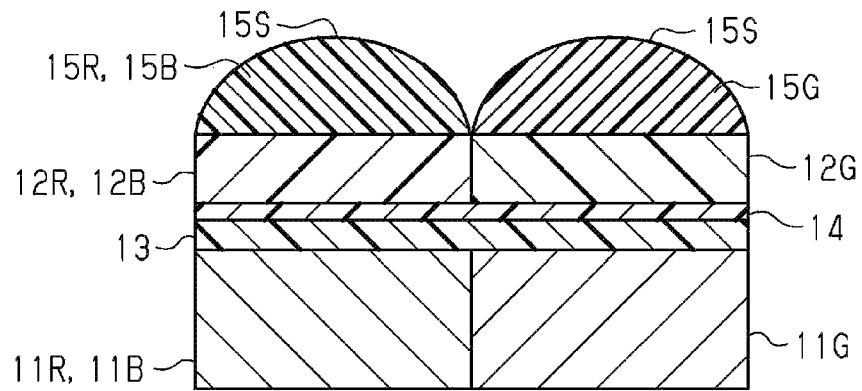
FIG. 8 is a cross-sectional view of a layer structure according to a sixth modification of a solid-state image sensor of the first embodiment.

As shown in FIG. 8, the position of the infrared cut-off filter 13 and the position of the barrier layer 14 are not limited to between the color microlenses 15R, 15G, and 15B and the color filters 12R, 12G, and 12B. The position of the infrared cut-off filter 13 and the position of the barrier layer 14 may be modified to between the color filters 12R, 12G, and 12B and the photoelectric conversion elements 11. In short, the infrared cut-off filter 13 and the barrier layer 14 may be disposed on a light-incident side of the photoelectric conversion elements 11.

<Seventh Modification>

Figure 9:
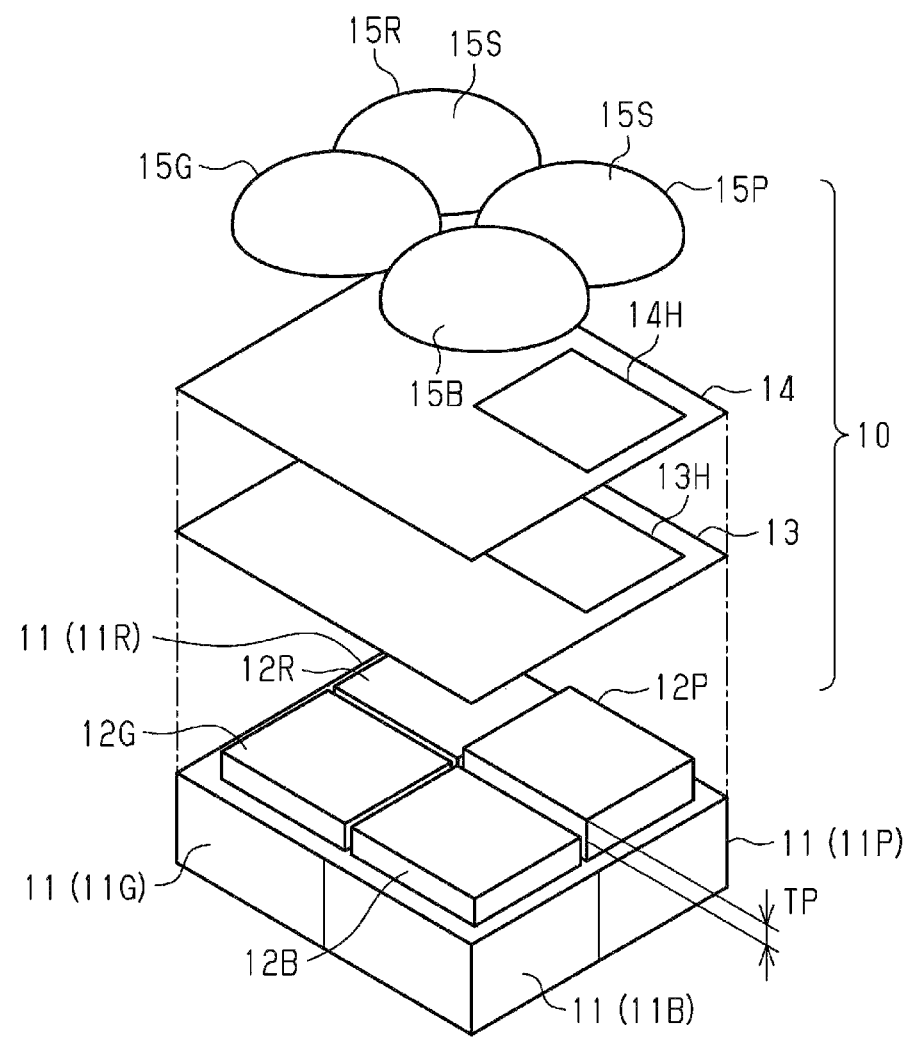
FIG. 9 is a partial exploded perspective view of a layer structure according to a seventh modification of a solid-state image sensor of the first embodiment.

As shown in FIG. 9, a plurality of photoelectric conversion elements 11 can include an infrared photoelectric conversion element 11P for measuring the intensity of infrared light. In this case, the solid-state image sensor filter 10 includes an infrared pass filter 12P on a light-incident side of the infrared photoelectric conversion element 11P.

The infrared pass filter 12P cuts off visible light that may otherwise be detected by the infrared photoelectric conversion element 11P, to prevent it from reaching the infrared photoelectric conversion element 11P, to thereby improve the accuracy of detection of infrared light by the infrared photoelectric conversion element 11P. The infrared light that may be detected by the infrared photoelectric conversion element 11P is near-infrared light having a wavelength of, for example, 800 nm or more and 1200 nm or less. The infrared pass filter 12P is formed by forming a coating film containing a black photosensitive resin and patterning the coating film by using a photolithography method.

The infrared cut-off filter 13 has a through hole 13H on a light-incident side of the infrared pass filter 12P such that the infrared cut-off filter 13 is not present on a light-incident side of the infrared pass filter 12P. The infrared cut-off filter 13 is common to the red filter 12R, the green filter 12G, and the blue filter 12B. That is, a single infrared cut-off filter 13 covers the red filter 12R, the green filter 12G, and the blue filter 12B.

The through hole 13H of the infrared cut-off filter 13 is formed by a processing method such as patterning using photolithography or dry etching. When the through hole 13H is formed by photolithography, a photosensitive composition containing an infrared absorbing dye is used as a material for constituting the infrared cut-off filter 13. The photosensitive composition may contain a binder resin, a photopolymerization initiator, a polymerizable monomer, an organic solvent, a leveling agent, and the like.

Examples of the binder resin include acrylic resins, polyamide-based resins, polyimide-based resins, polyurethane-based resins, polyester-based resins, polyether-based resins, polyolefin-based resins, polycarbonate-based resins, polystyrene-based resins, and norbornene-based resins.

Examples of the photopolymerization initiator include acetophenone-based photopolymerization initiators, benzoin-based photopolymerization initiators, benzophenone-based photopolymerization initiators, thioxanthone-based photopolymerization initiators, triazine-based photopolymerization initiators, oxime ester-based photopolymerization initiators, and the like. As the photopolymerization initiator, these photopolymerization initiators may be used singly or in combination of two or more.

Examples of the polymerizable monomer include (meth)acrylic acid, (meth)acrylic acid esters such as methyl (meth)acrylate, ethyl (meth)acrylate, propyl (meth)acrylate, isopropyl (meth)acrylate, butyl (meth)acrylate, isobutyl (meth)acrylate, tert-butyl (meth)acrylate, benzyl (meth)acrylate, phenyl (meth)acrylate, cyclohexyl (meth)acrylate, phenoxyethyl (meth)acrylate, 2-ethylhexyl (meth)acrylate, isobornyl (meth)acrylate, 2-hydroxyethyl (meth)acrylate, and tetrahydrofurfuryl (meth)acrylate; N-vinyl pyrrolidone; styrenes such as styrene and derivatives thereof, and α-methyl styrene; acrylamides such as (meth)acrylamide, methylol (meth)acrylamide, alkoxymethylol (meth)acrylamide, and diacetone(meth)acrylamide; other vinyl compounds such as (meth)acrylonitrile, ethylene, propylene, butylene, vinyl chloride, and vinyl acetate, and macromonomers such as polymethylmethacrylate macromonomer, and polystyrene macromonomer. As the polymerizable monomer, these monomers may be used singly or in combination of two or more.

Examples of the organic solvent include ethyl lactate, benzyl alcohol, 1,2,3-trichloro propane, 1,3-butanediol, 1,3-butylene glycol, 1,3-butylene glycol diacetate, 1,4-dioxane, 2-heptanone, 2-methyl-1,3-propane diol, 3,5,5-trimethyl-2-cyclohexen-1-one, 3,3,5-trimethylcyclohexanone, ethyl 3-ethoxypropionate, 3-methyl-1,3-butanediol, 3-methoxy-3-methyl-1-butanol, 3-methoxy-3-methylbutyl acetate, 3-methoxy butanol, 3-methoxybutyl acetate, 4-heptanone, m-xylene, m-diethylbenzene, m-dichlorobenzene, N,N-dimethylacetamide, N,N-dimethylformamide, n-butyl alcohol, n-butylbenzene, n-propyl acetate, o-xylene, o-chlorotoluene, o-diethylbenzene, o-dichlorobenzene, p-chlorotoluene, p-diethylbenzene, sec-butylbenzene, tert-butylbenzene, γ-butyrolactone, isobutyl alcohol, isophorone, ethylene glycol diethylether, ethylene glycol dibutyl ether, ethylene glycol monoisopropyl ether, ethylene glycol monoethyl ether, ethylene glycol monoethyl ether acetate, ethylene glycol mono-tert-butyl ether, ethylene glycol monobutyl ether, ethylene glycol monobutyl ether acetate, ethylene glycol monopropyl ether, ethylene glycol monohexyl ether, ethylene glycol monomethyl ether, ethylene glycol monomethyl ether acetate, diisobutyl ketone, diethylene glycol diethyl ether, diethylene glycol dimethyl ether, diethylene glycol monoisopropyl ether, diethylene glycol monoethyl ether acetate, diethylene glycol monobutyl ether, diethylene glycol monobutyl ether acetate, diethylene glycol monomethyl ether, cyclohexanol, cyclohexanol acetate, cyclohexanone, dipropylene glycol dimethyl ether, dipropylene glycol methyl ether acetate, dipropylene glycol monoethyl ether, dipropylene glycol monobutyl ether, dipropylene glycol monopropyl ether, dipropyleneglycol monomethyl ether, diacetone alcohol, triacetin, tripropylene glycol monobutyl ether, tripropyleneglycol monomethyl ether, propylene glycol diacetate, propylene glycol phenyl ether, propylene glycol monoethyl ether, propylene glycol monoethyl ether acetate, propylene glycol monobutyl ether, propylene glycol monopropyl ether, propyleneglycol monomethyl ether, propyleneglycol monomethyl ether acetate, propyleneglycol monomethyl ether propionate, benzyl alcohol, methyl isobutyl ketone, methyl cyclohexanol, n-amyl acetate, n-butyl acetate, isoamyl acetate, isobutyl acetate, propyl acetate, and dibasic esters. As the organic solvent, these solvents may be used singly or in combination of two or more.

The leveling agent is preferably dimethylsiloxane having a polyether structure or a polyester structure in the main chain. The dimethylsiloxane having a polyether structure in the main chain may be, for example, FZ-2122 manufactured by Toray Dow Corning Co. Ltd., BYK-333 manufactured by BYK Chemie Co., Ltd., or the like. The dimethylsiloxane having a polyester structure in the main chain may be, for example, BYK-310 or BYK-370 manufactured by BYK Chemie Co., Ltd., or the like. As the leveling agent, both the dimethylsiloxane having a polyether structure and the dimethylsiloxane having a polyester structure may be used. As the leveling agent, these may be used singly or in combination of two or more.

When the through hole 13H of the infrared cut-off filter 13 is formed by dry etching, a curable composition containing an infrared absorbing dye is used as a material constituting the infrared cut-off filter 13. The curable composition includes transparent resin. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin.

The barrier layer 14 has a through hole 14H on a light-incident side of the infrared pass filter 12P. Accordingly, the barrier layer 14 is not present on a light-incident side of the infrared pass filter 12P. The barrier layer 14 is common to the red filter 12R, the green filter 12G, and the blue filter 12B. That is, one barrier layer 14 covers the red filter 12R, the green filter 12G, and the blue filter 12B.

The through hole 14H of the barrier layer 14 may be formed by any processing method by which a hole penetrating the barrier layer 14 can be formed. For example, the through hole 14H may be formed by dry etching.

Each of the color filters 12R, 12G, and 12B is thinner than the infrared pass filter 12P. The sum of the thickness of the infrared cut-off filter 13 and the thickness of the barrier layer 14 corresponds to a difference between the thickness of each of the color filters 12R, 12G, and 12B and the thickness of the infrared pass filter 12P.

(1-11) According to the seventh modification, light resistance of the infrared cut-off filter 13 can be improved, and measurement of visible light by the color photoelectric conversion elements 11R, 11G, and 11B and measurement of infrared light by the infrared photoelectric conversion element 11P are possible.

(1-12) The thickness of the infrared pass filter 12P that cuts off visible light tends to be larger than the thickness of each of the color filters 12R, 12G, and 12B. On the other hand, a level difference TP between the infrared pass filter 12P and the color filters 12R, 12G, and 12B is filled by the infrared cut-off filter 13 and the barrier layer 14. Accordingly, even when the level difference TP is formed between the color filters 12R, 12G, and 12B and the infrared pass filter 12P, flatness of a layer underlying the microlenses 15R, 15G, and 15B, and the infrared microlens 15P can be easily obtained.

<Others>

The solid-state image sensor may include an anchor layer between the barrier layer 14 and a layer underlying the barrier layer 14. Accordingly, the anchor layer can enhance adhesion between the barrier layer 14 and the layer underlying the barrier layer 14. Further, the solid-state image sensor may include an anchor layer between the barrier layer 14 and a layer overlying the barrier layer 14. Accordingly, the anchor layer can enhance adhesion between the barrier layer 14 and the layer overlying the barrier layer 14.

A material constituting the anchor layer may be, for example, a polyfunctional acrylic resin or a silane coupling agent. The film thickness of the anchor layer may be, for example, 50 nm or more and 1 μm or less. When the anchor layer has a thickness of 50 nm or more, adhesion between layers can be easily obtained. When the anchor layer has a thickness of 1 μm or less, absorption of light by the anchor layer can be easily suppressed.

A plurality of photoelectric conversion elements 11 may be composed of an organic photoelectric conversion element and an inorganic photoelectric conversion element. With this configuration, the color filters 12R, 12G, and 12B can be omitted. Even when the color filters 12R, 12G, and 12B are omitted, it is possible to protect the cut off function of the infrared cut-off filter 13 by the solid-state image sensor filter 10 having the infrared cut-off filter 13 and the above-mentioned barrier function.

The solid-state image sensor filter 10 may include a black matrix and a flattening layer between the plurality of photoelectric conversion elements 11 and the color filters 12R, 12G, and 12B. The black matrix prevents light of each color selected by the corresponding color filters 12R, 12G, and 12B from entering the photoelectric conversion elements 11 for other colors. The flattening layer fills the level difference in the black matrix to thereby flatten the underlayer of the color filters 12R, 12G, and 12B, and the underlayer of the infrared cut-off filter 13. Accordingly, the flattening layer flattens the underlayer of the barrier layer 14.

The color filters may be modified to those for three colors composed of a cyan filter, a yellow filter, and a magenta filter. Further, the color filters may be modified to those for four colors composed of a cyan filter, a yellow filter, a magenta filter, and a black filter. Further, the color filters may be modified to those for four colors composed of a transparent filter, a yellow filter, a red filter, and a black filter.

The color filters 12R, 12G, and 12B have a refractive index of, for example, 1.6 or more and 1.9 or less. The microlenses 15R, 15G, and 15B have a refractive index of, for example, 1.4 or more and 2.0 or less. More preferably, the microlenses 15R, 15G, and 15B have a refractive index of 1.5 or more and 1.7 or less. Materials constituting the infrared cut-off filter 13 and the infrared pass filter 12P can contain particles of inorganic oxide in order to reduce a difference between refractive indices of the respective color filters 12R, 12G, and 12B and the respective microlenses 15R, 15G, and 15B. Examples of the inorganic oxide include aluminum oxide, silicon oxide, zirconium oxide, and titanium oxide.

Materials constituting the infrared cut-off filter 13 and the infrared pass filter 12P can contain additives such as a photostabilizer, an antioxidant, a thermal stabilizer, and antistatic agent in order to provide other functions.

The solid-state image sensor can be modified to a configuration in which the barrier layer 14 is omitted and a laminate structure located on a side of the infrared cut-off filter 13 on which the light-incident surface 15S is disposed has an oxygen transmittance of 5.0 cc/m²/day/atm or less. For example, the laminate structure may include the color filters 12R, 12G, and 12B, the flattening layer, and the color microlenses 15R, 15G, and 15B, and have an oxygen transmittance of 5.0 cc/m²/day/atm or less.

Second Embodiment

Figure 10:
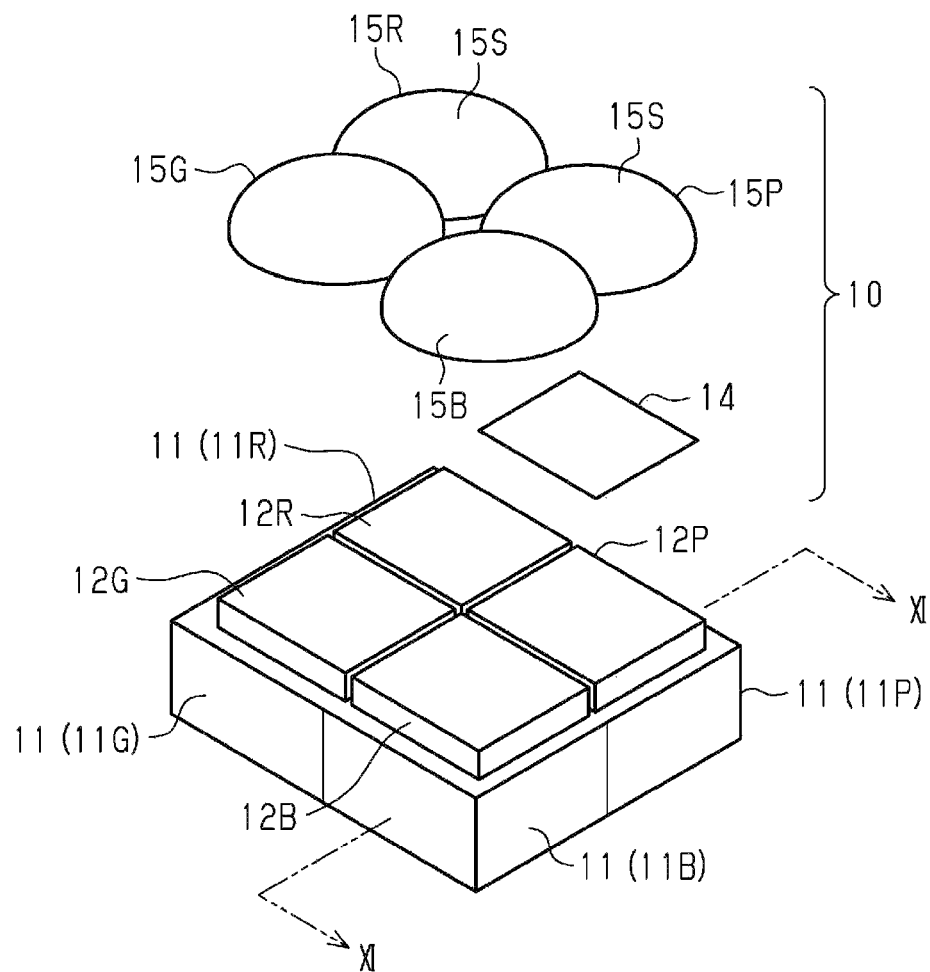
FIG. 10 is a partial exploded perspective view of a layer structure according to a second embodiment of a solid-state image sensor.
Figure 11:
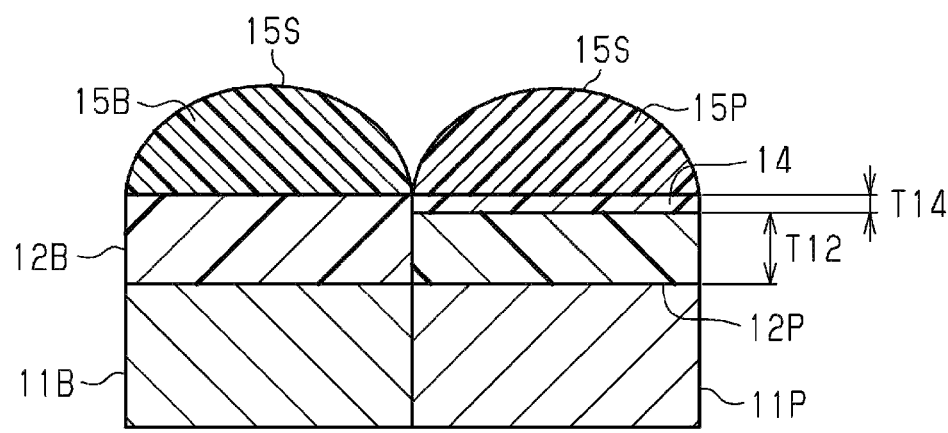
FIG. 11 is a cross-sectional view taken along the line XI-XI of FIG. 10.
Figure 12:
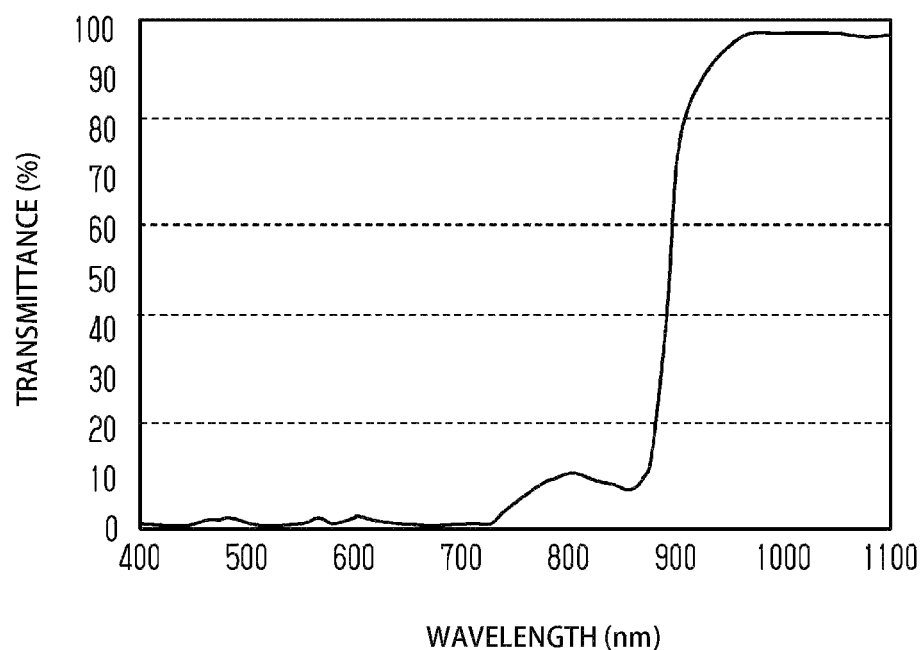
FIG. 12 is a graph showing an example of a transmission spectrum of an infrared pass filter.

With reference to FIGS. 10 to 12, a second embodiment of the solid-state image sensor will be described. FIG. 10 is a schematic configuration diagram in which layers in part of a solid-state image sensor are separately illustrated.

As shown in FIG. 10, the solid-state image sensor includes a solid-state image sensor filter 10 and a plurality of photoelectric conversion elements 11. The solid-state image sensor filter 10 includes color filters 12R, 12G, and 12B, an infrared pass filter 12P, a barrier layer 14, and microlenses 15R, 15G, 15B, and 15P. The infrared pass filter 12P is an example of an infrared filter.

The color filters 12R, 12G, and 12B are disposed between photoelectric conversion elements 11R, 11G, and 11B for three colors and the microlenses 15R, 15G, and 15B, respectively. The infrared pass filter 12P is disposed between an infrared photoelectric conversion element 11P and the microlens 15P. The barrier layer 14 is disposed between the infrared pass filter 12P and the infrared microlens 15P. The barrier layer 14 is disposed on a light-incident side of the infrared pass filter 12P.

The photoelectric conversion elements 11 for three colors are examples of the first photoelectric conversion element, and composed of the red photoelectric conversion element 11R, the green photoelectric conversion element 11G, and the blue photoelectric conversion element 11B. The infrared photoelectric conversion element 11P is an example of the second photoelectric conversion element. The solid-state image sensor includes a plurality of red photoelectric conversion elements 11R, a plurality of green photoelectric conversion elements 11G, a plurality of blue photoelectric conversion elements 11B, and a plurality of infrared photoelectric conversion elements 11P. FIG. 10 illustrates one repeating unit of the photoelectric conversion elements 11 in the solid-state image sensor.

As shown in FIG. 11, the color filters 12R, 12G, and 12B have thicknesses T12 which may be different from that of the infrared pass filter 12P, or may be the same as that of the infrared pass filter 12P. The thickness T12 of the color filters 12R, 12G, and 12B is, for example, 0.5 μm or more and 5 μm or less.

A function of the infrared pass filter 12P of transmitting infrared light may depend on a thickness T12 of the infrared pass filter 12P. The processing accuracy of the microlenses 15R, 15G, and 15B disposed on the color filters 12R, 12G, and 12B, respectively, and the microlens 15P disposed on the barrier layer 14 may be reduced due to a level difference between the color filters 12R, 12G, and 12B and the barrier layer 14. Therefore, in view of improvement in flatness of an underlayer of the microlenses 15R, 15G, 15B, and 15P, the sum of the thickness T12 of the infrared pass filter 12P and the thickness T14 of the barrier layer 14 is preferably substantially equal to the thickness of each of the color filters 12R, 12G, and 12B.

The infrared pass filter 12P cuts off visible light that may otherwise be detected by the infrared photoelectric conversion element 11P, to prevent it from reaching the infrared photoelectric conversion element 11P, to thereby improve the accuracy of detection of near-infrared light by the infrared photoelectric conversion element 11P. That is, the infrared pass filter 12P prevents the visible light that may be detected by the infrared photoelectric conversion element 11P from passing through to the infrared photoelectric conversion element 11P. The infrared pass filter 12P is a layer disposed only on the infrared photoelectric conversion element 11P.

Materials constituting the infrared pass filter 12P include a black colorant or a black dye, and a transparent resin. The black colorant may be a single colorant having a black color, or a mixture of two or more colorants having a black color. Examples of the black dye include azo-based dye, anthraquinone-based dye, azine-based dye, quinoline-based dye, perinone-based dye, perylene-based dye, and methine-based dye. Examples of the transparent resin include acrylic resin, polyamide-based resin, polyimide-based resin, polyurethane-based resin, polyester-based resin, polyether-based resin, polyolefin-based resin, polycarbonate-based resin, polystyrene-based resin, and norbornene-based resin. The infrared pass filter 12P is formed by film formation using a liquid phase film formation method such as coating.

A material constituting the infrared pass filter 12P can contain particles of inorganic oxide in order to adjust the refractive index of the infrared pass filter 12P. Examples of the inorganic oxide include aluminum oxide, silicon oxide, zirconium oxide, and titanium oxide. The infrared pass filter 12P can contain additives such as a photostabilizer, an antioxidant, a thermal stabilizer, and antistatic agent in order to provide other functions.

As shown in FIG. 12, the transmission spectrum of the infrared pass filter 12P shows, for example, a transmittance of 3% or less in the wavelength range of 400 nm or more and 700 nm or less. On the other hand, the infrared pass filter 12P has a transmittance of 10% or more at the wavelength of 850 nm as a peak, and a transmittance of 90% or more at the wavelength of 900 nm or more.

The solar spectrum has absorption bands due to absorption by water vapor at wavelengths around 940 nm. Accordingly, the spectral intensity in the solar spectrum decreases at wavelengths around 940 nm. Therefore, when the solid-state image sensor is used outdoors in the day time, near-infrared light having the wavelength of 940 nm is not likely to be affected by sunlight, which is ambient light. That is, when the center wavelength of a light source that is used is 940 nm, a solid-state image sensor with less noise can be provided. The infrared photoelectric conversion element 11P detects near-infrared light having a wavelength of 940 nm.

The barrier layer 14 suppresses transmission of oxygen and water, which are oxidation sources to the infrared pass filter 12P, to thereby suppress a decrease in the visible light cut-off performance and a decrease in the near-infrared light transmission performance of the black colorant and black dye. The barrier layer 14 is located on a side of the infrared pass filter 12P on which the light-incident surface 15S is disposed, and is not located on a side of the color filters 12R, 12G, and 12B on which the light-incident surface 15S is disposed. That is, the barrier layer 14 covers the infrared pass filter 12P, but does not cover the color filters 12R, 12G, and 12B.

As with the barrier layer 14 of the first embodiment, the oxygen transmittance, thickness, and transmittance in the visible light range of the barrier layer 14 preferably satisfy the above condition [B1] or [B3].

With a configuration satisfying [B1], it is possible to sufficiently prevent an oxidation source, particularly oxygen, from reaching the infrared pass filter 12P. In view of improvement in light resistance of the infrared cut-off filter 13, the oxygen transmittance is preferably 3.0 cc/m$^2$/day/atm or less, more preferably 1.0 cc/m$^2$/day/atm or less, and still more preferably 0.7 cc/m$^2$/day/atm or less.

With a configuration satisfying [B2], a material constituting [B1] and [B3] can be easily selected. Further, it is also possible to prevent occurrence of cracking in the barrier layer 14. With a configuration satisfying [B3], absorption of the visible light by the barrier layer 14 is sufficiently suppressed.

As described above, according to the second embodiment of the solid-state image sensor filter and the solid-state image sensor, the following effects can be achieved.

(2-1) Since the barrier layer 14 prevents an oxidation source from reaching the infrared pass filter 12P, oxidation of the infrared pass filter 12P by the oxidation source can be suppressed. Accordingly, it is possible to improve the light resistance of the infrared pass filter 12P, and thus improve the light resistance of the solid-state image sensor.

(2-2) With a configuration satisfying [B1], the effect as in the above (2-1) can also be achieved. In particular, oxidation of the infrared pass filter 12P due to oxygen can be suppressed.

(2-3) When the sum of the thickness T12 of the infrared pass filter 12P and the thickness T14 of the barrier layer 14 is substantially the same as the thickness of each of the color filters 12R, 12G, and 12B, the underlayer of the microlenses 15R, 15G, 15B, and 15P can have high flatness. Accordingly, it is also possible to prevent occurrence of variation in processing and shape of the microlenses 15R, 15G, 15B, and 15P.

The above second embodiment can be modified and implemented as follows.

<First Modification>

Figure 13:
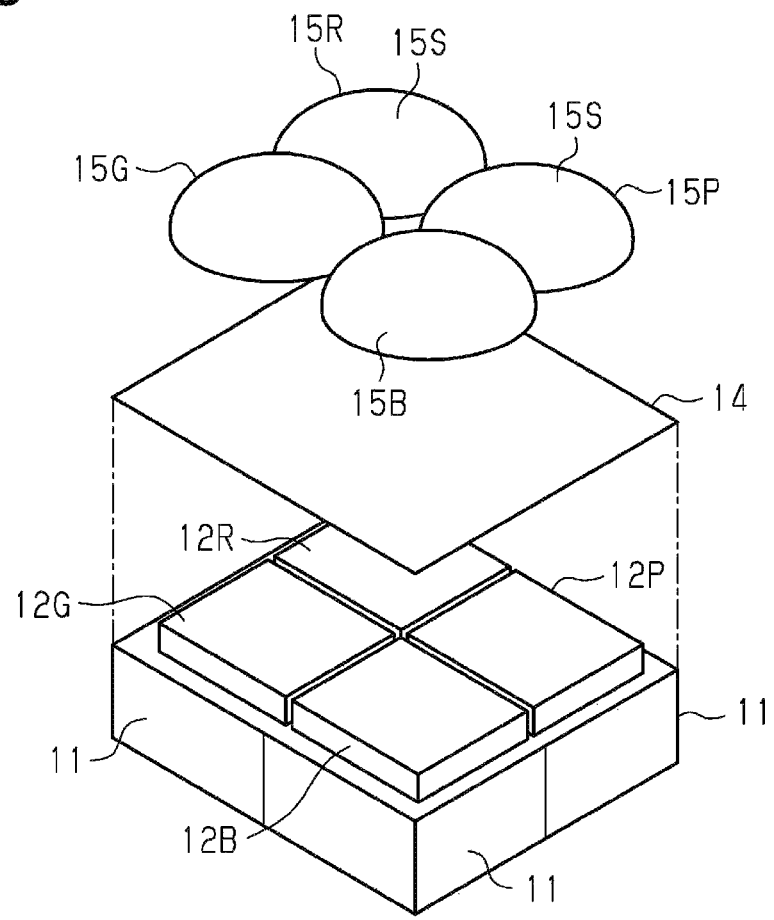
FIG. 13 is a partial exploded perspective view of a layer structure according to a first modification of a solid-state image sensor of the second embodiment.

As shown in FIG. 13, the barrier layer 14 may be disposed on a light-incident side of the infrared pass filter 12P and the color filters 12R, 12G, and 12B. That is, the barrier layer 14 may be disposed on a side of all of the photoelectric conversion elements 11 facing the light-incident surface 15S.

(2-4) When the barrier layer 14 is configured to be located on a side of all of the photoelectric conversion elements 11 facing the light-incident surface 15S, the barrier layer 14 can be formed by using a method of forming the barrier layer 14 on the entirety of a layer where the film is to be formed. Since a separate step of removing the barrier layer 14 from the color filters 12R, 12G, and 12B is not necessary, the method of forming the solid-state image sensor can be simplified.

(2-5) Since the light-incident surface 15S-side of the color filters 12R, 12G, and 12B adjacent to the infrared pass filter 12P is covered by the barrier layer 14, oxidation of the infrared pass filter 12P can be further effectively reduced.

<Second Modification>

Figure 14:
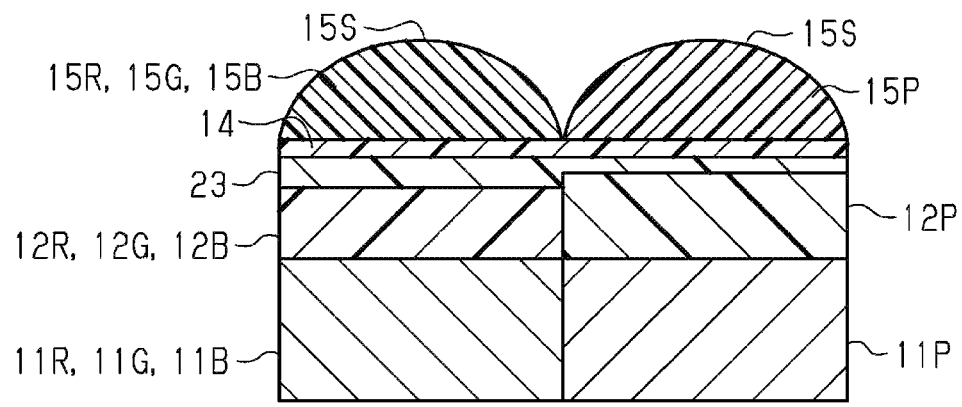
FIG. 14 is a cross-sectional view of a layer structure according to a second modification of a solid-state image sensor of the second embodiment.

As shown in FIG. 14, the infrared pass filter 12P that cuts off all the wavelength bands of visible light tends to have a thickness different from that of the respective color filters 12R, 12G, and 12B. Accordingly, the infrared pass filter 12P tends to form a level difference between the infrared pass filter 12P and the respective color filters 12R, 12G, and 12B. In this case, the top and part of the peripheral surface of the infrared pass filter 12P are exposed from the respective color filters 12R, 12G, and 12B.

As in the first modification, when the barrier layer 14 is located on a side of all of the photoelectric conversion elements 11 facing the light-incident surface 15S, the barrier layer 14 tends to have a shape following the level difference formed between the infrared pass filter 12P and the color filters 12R, 12G, and 12B. The shape of the barrier layer 14 following the level difference causes variations in thickness of the barrier layer 14, and thus the barrier function of the oxidation source. In particular, a barrier function against the oxidation source may decrease in part of the peripheral surface of the infrared pass filter 12P.

Therefore, a flattening layer 23 may be further provided between the infrared pass filter 12P, the color filters 12R, 12G, and 12B, and the barrier layer 14. The flattening layer 23 has optical transmittance for transmitting visible light, and a surface of the flattening layer 23 has a flat surface, filling the level difference formed by the infrared pass filter 12P. That is, the flattening layer 23 has a shape that can reduce the difference in height formed by the infrared pass filter 12P and the color filters 12R, 12G, and 12B.

A material constituting the flattening layer 23 may be a material that can be used for the flattening layer 21 of the first embodiment.

(2-6) When the flattening layer 23 is further provided, the effect as in the above (2-1) and (2-5) can be obtained even when part of the peripheral surface of the infrared pass filter 12P is exposed from the color filters 12R, 12G, and 12B.

<Third Modification>

Figure 15:
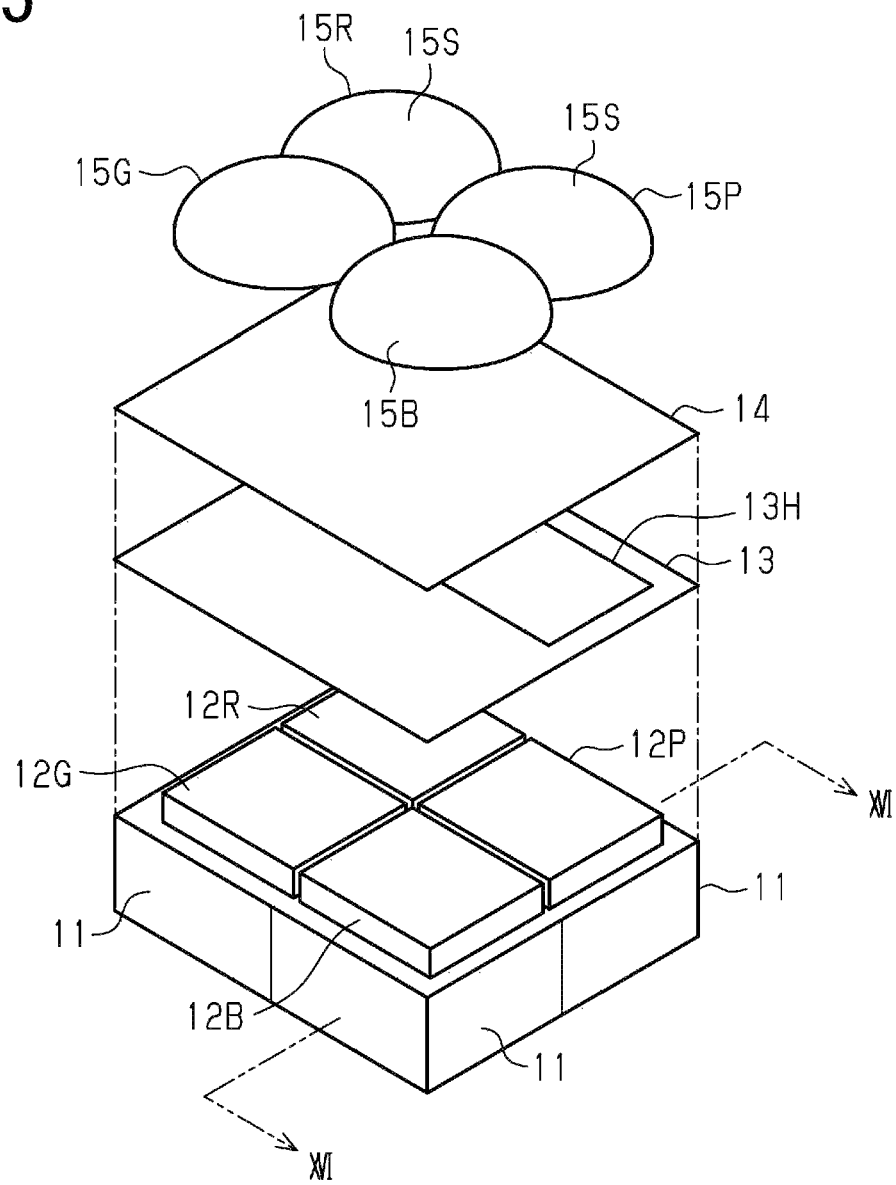
FIG. 15 is a partial exploded perspective view of a layer structure according to a third modification of a solid-state image sensor of the second embodiment.

As shown in FIG. 15, the solid-state image sensor further includes an infrared cut-off filter 13. The infrared cut-off filter 13 cuts off the infrared light that may otherwise be detected by the respective color photoelectric conversion elements 11R, 11G, and 11B, to thereby improve the accuracy of detection of visible light by the photoelectric conversion elements 11. The infrared light that may be detected by the photoelectric conversion elements 11 is near-infrared light having a wavelength of, for example, 800 nm or more and 1000 nm or less. The infrared cut-off filter 13 is a layer common to the red filter 12R, the green filter 12G, and the blue filter 12B. That is, a single infrared cut-off filter 13 covers the red filter 12R, the green filter 12G, and the blue filter 12B.

The infrared cut-off filter 13 is disposed on a light-incident side of the color filters 12R, 12G, and 12B. The infrared cut-off filter 13 has a through hole 13H on a light-incident side of the infrared pass filter 12P such that the infrared cut-off filter 13 is not present on a light-incident side of the infrared pass filter 12P.

An infrared light cut-off function of the infrared cut-off filter 13 may depend on a thickness of the infrared cut-off filter 13. The thickness of the infrared cut-off filter 13 may vary depending on the level difference among the color filters 12R, 12G, and 12B at positions on the color filters 12R, 12G, and 12B, and between the color filters 12R, 12G, and 12B. In view of improvement in flatness of an underlayer of the infrared cut-off filter 13, the difference in the thickness among the color filters 12R, 12G, and 12B is preferably smaller than the thickness of the infrared cut-off filter 13.

Figure 16:
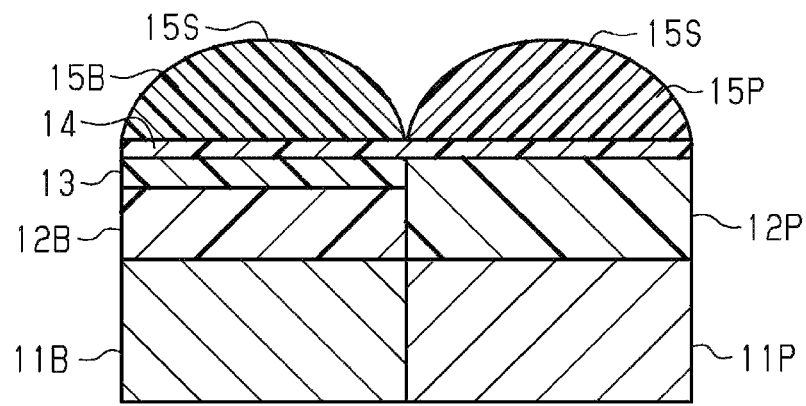
FIG. 16 is a cross-sectional view taken along the line XVI-XVI of FIG. 15.

As shown in FIG. 16, each of the color filters 12R, 12G, and 12B is thinner than the infrared pass filter 12P. In this case, the infrared cut-off filter 13 preferably has a thickness corresponding to the difference in film thickness between each of the color filters 12R, 12G, and 12B and the infrared pass filter 12P.

In the example shown in FIG. 16, a surface of the infrared pass filter 12P on a side on which the light-incident surface is disposed and a surface of the infrared cut-off filter 13 on a side on which the light-incident surface is disposed are located at the same height. That is, a surface of the infrared pass filter 12P in contact with the barrier layer 14 and a surface of the infrared cut-off filter 13 in contact with the barrier layer 14 are located at the same height. In other words, a surface of the infrared pass filter 12P on a side on which the light-incident surface is disposed and a surface of the infrared cut-off filter 13 on a side on which the light-incident surface is disposed are flush with each other.

The transmission spectrum of the infrared cut-off filter 13 preferably satisfies the above conditions [A1] to [A3].

With a configuration satisfying [A1], absorption of the visible light by the infrared cut-off filter 13 is sufficiently suppressed. With a configuration satisfying [A2] and [A3], the infrared cut-off filter 13 sufficiently cuts off infrared light that may otherwise be detected by the respective color photoelectric conversion elements 11, and prevents visible light from being cut off.

(2-7) When the infrared absorbing dye is exposed to oxygen and water in the atmosphere in an environment irradiated with sunlight, the transmission spectrum in the near-infrared range changes. That is, when the infrared cut-off filter 13 is exposed to an oxidation source in an environment irradiated with sunlight, the near-infrared light cut-off performance decreases. In this regard, since the barrier layer 14 is located on a side of the infrared cut-off filter 13 on which the light-incident surface 15S is disposed, it is possible to enhance light resistance of the infrared cut-off filter 13.

(2-8) Since the light resistance of the infrared pass filter 12P and the light resistance of the infrared cut-off filter 13 are increased by a single barrier layer 14, a layer configuration of the solid-state image sensor can be simplified compared with a configuration having separate barrier layers.

(2-9) When the sum of the thickness of the infrared cut-off filter 13 and the thickness of each of the color filters 12R, 12G, and 12B corresponds to the thickness of the infrared pass filter 12P, it is possible to provide suitable flatness to the underside of the barrier layer 14. Accordingly, occurrence of variation in the effect of the above (2-1) and (2-7) can be reduced.

<Others>

The barrier layer 14 may not necessarily be disposed between the infrared pass filter 12P and the infrared microlens 15P, and may be disposed on the outer surface of the infrared microlens 15P. In this case, the outer surface of the barrier layer 14 functions as a light-incident surface of the solid-state image sensor on which light is incident. In short, the barrier layer 14 may be positioned on a light-incident side of the infrared pass filter 12P. With this configuration, the barrier layer 14 is disposed on an optical surface (flat surface) of the infrared microlens 15P. Accordingly, the thickness of the barrier layer 14 can be easily made uniform, and thus the barrier function of the barrier layer 14 against an oxidation source can be easily made uniform.

The solid-state image sensor may include an anchor layer between the barrier layer 14 and a layer underlying the barrier layer 14. Accordingly, the anchor layer can enhance adhesion between the barrier layer 14 and the layer underlying the barrier layer 14. Further, the solid-state image sensor may include an anchor layer between the barrier layer 14 and a layer overlying the barrier layer 14. Accordingly, the anchor layer can enhance adhesion between the barrier layer 14 and the layer overlying the barrier layer 14.

A material constituting the anchor layer and a thickness of the anchor layer may be the same as those in the modifications of the first embodiment.

A plurality of photoelectric conversion elements 11 may be composed of an organic photoelectric conversion element and an inorganic photoelectric conversion element, and the color filters 12R, 12G, and 12B may be omitted from the solid-state image sensor filter 10. Even when the color filters 12R, 12G, and 12B are omitted, it is possible to protect the transmission function of the infrared pass filter 12P by the above-mentioned barrier function when the infrared pass filter 12P is provided.

The solid-state image sensor filter 10 may include a black matrix and a flattening layer between the plurality of photoelectric conversion elements 11 and the color filters 12R, 12G, 12B, and the infrared pass filter 12P. The black matrix prevents light of each color selected by the corresponding color filters 12R, 12G, and 12B from entering the photoelectric conversion elements 11 for other colors. The flattening layer fills the level difference in the black matrix to thereby flatten the underlayer of the color filters 12R, 12G, and 12B, the underlayer of the infrared pass filter 12P, and the underlayer of the infrared cut-off filter 13. Accordingly, the flattening layer flattens the underlayer of the barrier layer 14.

The color filters may be modified to those for three colors composed of a cyan filter, a yellow filter, and a magenta filter. Further, the color filters may be modified to those for four colors composed of a cyan filter, a yellow filter, a magenta filter, and a black filter. Further, the color filters may be modified to those for four colors composed of a transparent filter, a yellow filter, a red filter, and a black filter.

The color filters 12R, 12G, and 12B have a refractive index of, for example, 1.7 or more and 1.9 or less. The microlenses 15R, 15G, and 15B have a refractive index of, for example, 1.5 or more and 1.6 or less. Materials constituting the infrared pass filter 12P and the infrared cut-off filter 13 can contain particles of inorganic oxide in order to reduce a difference between refractive indices of the respective color filters 12R, 12G, and 12B and the respective microlenses 15R, 15G, and 15B. Examples of the inorganic oxide include aluminum oxide, silicon oxide, zirconium oxide, and titanium oxide.

Materials constituting the infrared pass filter 12P and the infrared cut-off filter 13 can contain additives such as a photostabilizer, an antioxidant, a thermal stabilizer, and an antistatic agent in order to provide other functions.

The solid-state image sensor can be modified to a configuration in which the barrier layer 14 is omitted and a laminate structure located on a side of the infrared pass filter 12P on which the light-incident surface 15S is disposed has an oxygen transmittance of 5.0 cc/m$^2$/day/atm or less. For example, the laminate structure is formed by other functional layers such as a flattening layer, an adhesion layer, and the like. The laminate structure together with the infrared microlens 15P may form a structure having an oxygen transmittance of 5.0 cc/m$^2$/day/atm or less.

The solid-state image sensor may further include a band-pass filter on a light-incident side of the plurality of microlenses. The band-pass filter is a filter that transmits specific wavelengths of visible light and near-infrared light, and has a function similar to that of the infrared cut-off filter 13. That is, the band-pass filter can cut off unnecessary infrared light which may otherwise be detected by the respective color photoelectric conversion elements 11R, 11G, 11B, and the infrared photoelectric conversion element 11P. Accordingly, it is possible to improve the accuracy of detection of the visible light by the respective color photoelectric conversion elements 11R, 11G, and 11B, and detection of the near-infrared light in the 850 nm or 940 nm wavelength band by the infrared photoelectric conversion element 11P.

The present application addresses the following. Materials constituting an infrared filter including an infrared cut-off filter and an infrared pass filter tend not to have high light resistance compared with materials constituting a photoelectric conversion element and the like. On the other hand, with the development of image processing and sensing, the application range of solid-state image sensors is steadily expanding. A technique for improving the light resistance of infrared filters and, by extension, the light resistance of solid-state image sensors is being sought, with increasing demand for expanding the range of application of solid-state image sensors.

An aspect of the present invention is to provide a solid-state image sensor filter and a solid-state image sensor capable of improving light resistance of the solid-state image sensor.

A solid-state image sensor filter includes: a light-incident surface on which light is incident; an infrared filter located on a side of a photoelectric conversion element on which the light-incident surface is disposed, the infrared filter being provided to suppress transmission of infrared light; and a barrier layer located on a side of the infrared filter on which the light-incident surface is disposed, the barrier layer being provided to suppress transmission of an oxidation source to thereby prevent the infrared filter from being oxidized.

A solid-state image sensor filter includes: a light-incident surface on which light is incident; and an infrared filter located on a side of a photoelectric conversion element on which the light-incident surface is disposed, the infrared filter being provided to suppress transmission of infrared light, wherein a laminate structure located on a side of the infrared filter on which the light-incident surface is disposed has an oxygen transmittance of 5.0 cc/m$^2$/day/atm or less.

According to the above configurations, since an oxidation source is prevented from reaching the infrared filter, oxidation of the infrared filter by the oxidation source is suppressed. Accordingly, it is possible to improve the light resistance of the infrared filter, and thus improve the light resistance of the solid-state image sensor.

In the above solid-state image sensor filter, the infrared filter may be an infrared cut-off filter, and the infrared cut-off filter may be an array of microlenses containing an infrared absorber. With this configuration, since the microlenses having a function of collecting light toward the photoelectric conversion element further also have an infrared light cut-off function, the layer structure of the solid-state image sensor filter can be simplified.

In the above solid-state image sensor filter, the barrier layer may have a refractive index smaller than a refractive index of the microlenses. The refractive index of the microlenses containing an infrared absorber is larger than the refractive index of the microlenses that do not contain an infrared absorber, and light reflection at the surface of the microlenses increases. In this regard, according to the above configuration, in which the barrier layer has a refractive index smaller than a refractive index of the microlens layer containing an infrared absorber, light reflection at the surface of the microlenses can be reduced.

In the above solid-state image sensor filter, the barrier layer may have an antireflection function. With this configuration, the antireflection function can suppress a decrease in detection sensitivity due to reflection at the surface of the microlenses. In addition, since the barrier layer that reduces transmission of an oxidation source further has an antireflection function, the layer structure of the solid-state image sensor filter can also be simplified.

The above solid-state image sensor filter may include a color filter located on a side of the photoelectric conversion element on which the light-incident surface is disposed. With this configuration, the photoelectric conversion element may have a configuration common for all colors.

The above solid-state image sensor filter may include an infrared pass filter located on a side of the photoelectric conversion element on which the light-incident surface is disposed; and the infrared cut-off filter may have a through hole on a light-incident side of the infrared pass filter. With this configuration, light resistance of the infrared cut-off filter can be improved, and measurement of visible light and measurement of infrared light by an infrared photoelectric conversion element are possible.

In the above solid-state image sensor filter, the infrared filter may be an infrared pass filter, the photoelectric conversion element may be a first photoelectric conversion element, the solid-state image sensor filter may further include: a color filter located on a side of a second photoelectric conversion element on which the light-incident surface is disposed; and an infrared cut-off filter located on a side of the second photoelectric conversion element on which the light-incident surface is disposed, and the barrier layer may be located on a side of the infrared cut-off filter on which the light-incident surface is disposed.

With this configuration, light resistance of the infrared pass filter and light resistance of the infrared cut-off filter can be improved by a common barrier layer. Accordingly, light resistance of a multi-functional solid-state image sensor having an infrared light detection function and a visible light detection function can be improved with a simple configuration.

In the solid-state image sensor filter, a surface of the infrared pass filter on a side on which the light-incident surface is disposed and a surface of the infrared cut-off filter on a side on which the light-incident surface is disposed may be located at the same height.

With this configuration, the infrared pass filter and the infrared cut-off filter, which are layers underlying the barrier layer, are positioned at the same height. Accordingly, it is possible to decrease a level difference of an underlayer of the barrier layer. Compared with a configuration in which the barrier layer is disposed on an underlayer having a large level difference, the variation in thickness and composition of the barrier layer can be reduced, and the barrier layer can easily perform a transmission suppression function across the entire underlayer.

In the above solid-state image sensor filter, the barrier layer may have an oxygen transmittance of 5.0 cc/m$^2$/day/atm or less. With this configuration, since the oxygen transmittance of the barrier layer is set to 5.0 cc/m$^2$/day/atm or less, oxidation of the infrared cut-off filter by oxygen can be suppressed.

The above solid-state image sensor filter may further include a flattening layer that fills a level difference of an underlayer of the flattening layer, wherein the barrier layer may be located on a side of the flattening layer on which the light-incident surface is disposed.

With this configuration, since the barrier layer is located on a side of the flattening layer on which the light-incident surface is disposed, it is possible to decrease a level difference of the underlayer of the barrier layer. Compared with a configuration in which the barrier layer is disposed on an underlayer having a large level difference, the variation in thickness and composition of the barrier layer can be reduced, and the barrier layer can easily perform a transmission suppression function across the entire underlayer.

A solid-state image sensor for solving the above problem includes: a photoelectric conversion element; and the solid-state image sensor filter described above.

According to embodiments of the present invention, light resistance of a solid-state image sensor can be improved.

REFERENCE SIGNS LIST

10 . . . Solid-state image sensor filter
11 . . . Photoelectric conversion element
11R . . . Red photoelectric conversion element
11G . . . Green photoelectric conversion element
11B . . . Blue photoelectric conversion element
11P . . . Infrared photoelectric conversion element
12R . . . Red filter
12G . . . Green filter
12B . . . Blue filter
12P . . . Infrared pass filter
13 . . . Infrared cut-off filter
14 . . . Barrier layer
15R . . . Red microlens
15G . . . Green microlens
15B . . . Blue microlens
15P . . . Infrared microlens
15S . . . Light-incident surface
21, 22, 23 . . . Flattening layer Obviously, numerous modifications and variations of the present invention are possible in light of the above teachings. It is therefore to be understood that within the scope of the appended claims, the invention may be practiced otherwise than as specifically described herein.

What is claimed is:

1. A solid-state image sensor filter, comprising:
a plurality of color microlenses having a light-incident surface and configured to collect light incident on the light-incident surface toward a plurality of photoelectric conversion elements, respectively;
an infrared filter formed on an opposite side with respect to the light-incident surface of the plurality of color microlenses such that the infrared filter is configured to be positioned between the plurality of color microlenses and the plurality of photoelectric conversion elements and cover a plurality of color filters for the plurality of photoelectric conversion elements, respectively; and
a barrier layer formed between the plurality of color microlenses and the infrared filter and having a thickness in a range of 10 nm to 500 nm such that the barrier layer is configured to cover the infrared filter and suppress transmission of an oxidation source that oxidizes the infrared filter and that the barrier layer has an oxygen transmittance of 5.0 cc/m$^2$/day/atm or less and transmittance of 90% or more in a visible light range.

2. The solid-state image sensor filter according to claim 1, wherein the barrier layer has an oxygen transmittance of 3.0 cc/m$^2$/day/atm or less.

3. A solid-state image sensor, comprising:
a photoelectric conversion element; and
the solid-state image sensor filter of claim 1.

4. The solid-state image sensor filter according to claim 1, wherein the barrier layer comprises at least one material selected from the group consisting of silicon nitride, silicon oxide and silicon oxynitride.

5. The solid-state image sensor filter according to claim 4, wherein the barrier layer has an oxygen transmittance of 1.0 cc/m$^2$/day/atm or less.

6. The solid-state image sensor filter according to claim 1, wherein the barrier layer has an oxygen transmittance of 0.7 cc/m$^2$/day/atm or less.

7. A solid-state image sensor filter, comprising:
a plurality of color microlenses having a light-incident surface and configured to collect light incident on the light-incident surface toward a plurality of photoelectric conversion elements, respectively;
an infrared filter formed on an opposite side with respect to the light-incident surface of the plurality of color microlenses such that the infrared filter is configured to be positioned between the plurality of color microlenses and the plurality of photoelectric conversion elements and cover a plurality of color filters for the plurality of photoelectric conversion elements, respectively; and
a barrier layer comprising a laminate structure and formed between the plurality of color microlenses and the infrared filter such that the barrier layer is configured to cover the infrared filter and has a thickness in a range of 10 nm to 500 nm, an oxygen transmittance of 5.0 cc/m$^2$/day/atm or less and transmittance of 90% or more in a visible light range.

8. The solid-state image sensor filter according to claim 7, wherein the barrier layer has an oxygen transmittance of 1.0 cc/m$^2$/day/atm or less.

9. The solid-state image sensor filter according to claim 7, wherein the barrier layer comprises the laminate structure comprising a plurality of layers such that each of the layers comprises at least one material selected from the group consisting of silicon nitride, silicon oxide and silicon oxynitride.

10. The solid-state image sensor filter according to claim 7, wherein the barrier layer is formed such that the laminate structure is made of a single compound selected from the group consisting of silicon nitride, silicon oxide and silicon oxynitride.

11. The solid-state image sensor filter according to claim 7, wherein the barrier layer is formed such that the layers of the laminate structure are made of compounds different from each other.

12. The solid-state image sensor filter according to claim 7, wherein the barrier layer has an oxygen transmittance of 0.7 cc/m$^2$/day/atm or less.

* * * * *